United States Patent [19]
Rasmussen

[11] Patent Number: 5,348,258
[45] Date of Patent: Sep. 20, 1994

[54] Z-BRACKET CAMPER JACK MOUNTING ASSEMBLY

[76] Inventor: C. Martin Rasmussen, 374 S. Stirling Dr., Fruit Heights, Utah 84037

[21] Appl. No.: 983,073

[22] Filed: Nov. 30, 1992

[51] Int. Cl.$^5$ ............................................. B66F 13/00
[52] U.S. Cl. ............................. 248/218.4; 248/220.1; 248/300; 248/357; 248/688
[58] Field of Search .............. 248/688, 683, 300, 357, 248/188, 218.4, 220.1; 254/45, 418; 403/167, 384, 396

[56] References Cited

U.S. PATENT DOCUMENTS

| | | | |
|---|---|---|---|
| 2,201,826 | 5/1940 | Ditchfield | 248/200 |
| 2,477,466 | 7/1949 | Richardson | 403/384 X |
| 2,583,923 | 1/1952 | Anschuetz . | |
| 3,148,795 | 9/1964 | Leach | 254/45 X |
| 3,338,554 | 8/1967 | Gostomski | 254/45 X |
| 3,549,027 | 12/1970 | Batson | 214/38 |
| 3,567,271 | 3/1971 | Gostomski | 254/45 X |
| 3,640,502 | 2/1972 | Bargman, Jr. | 254/45 |
| 3,709,467 | 1/1973 | Mann | 254/45 |
| 3,758,074 | 9/1973 | Jeffries et al. | 254/45 |
| 3,897,074 | 7/1975 | Tallman | 254/45 |
| 4,015,822 | 4/1977 | Rasmussen | 254/45 |
| 4,930,270 | 6/1990 | Bevacqua | 248/357 X |

Primary Examiner—Karen J. Chotkowski
Attorney, Agent, or Firm—Workman, Nydegger & Jensen

[57] ABSTRACT

A mounting assembly for mounting a camper jack onto a camper body. A novel mounting bracket is used to mount a camper jack onto a camper body in a clean, attractive, and unobtrusive manner. The mounting bracket is formed of three integral flat portions, a first portion, a second portion, and a third portion. The three integral portions are formed into a generally z-shaped configuration wherein the second portion forms the middle of the mounting bracket, and the first and third portions extend perpendicularly from opposite ends of the second portion and in opposite directions from each other. When the mounting bracket is attached to the camper body, the first and second portions conform to the shape of a corner edge of the camper body. The third portion projects outwardly from the camper body. Once the mounting bracket is securely attached to the camper body, a camper jack can be conveniently positioned between the third portion and the second portion of the mounting bracket. The camper jack can be securely attached to the third portion of the mounting bracket by a carriage bolt. Mounted in this fashion, most of the mounting bracket is hidden by the camper jack.

6 Claims, 2 Drawing Sheets

Z-BRACKET CAMPER JACK MOUNTING ASSEMBLY

BACKGROUND

1. The Field of the Invention

The present invention relates to camper jack mounting assemblies and more specifically to apparatus for mounting camper jacks onto camper bodies.

2. Background Art

Camper bodies of the type which are mountable on truck beds have become increasingly popular. Lifting jacks are required in order to lift or move the camper bodies from the truck beds. Often, camper owners wish to deposit their campers on the ground at some location so that they can use their trucks separately. Alternately, the camper owners may wish to retain the camper bodies on the trucks, but may wish to stabilize them against undesired motion caused by movement within the camper body, or wind action against the side of the camper body.

For these purposes, hydraulic or mechanical jacks are attached to the camper, one jack being permanently secured on each corner of the camper body. One prior art method of securing the jack to the camper body has been use of a T-bracket having a T-shaped configuration. Part of the T-shape conforms to a corner edge of the camper body, with the remaining portion of the T projecting outwardly from the camper body. The jack is held to the camper body by being attached to this portion of the T-shaped bracket which projects outwardly.

Generally, a sphincter clamp is needed to clamp the jack to the outwardly projecting portion of the T-bracket along the top and the bottom of the jack. Attachment of the jack in this manner causes the jack to protrude from the camper in an unsightly and obtrusive manner. When protruding in this fashion, the jack is easily caught by passing objects. It is possible that the jacks may be torn off or badly bent when hit by passing objects.

An additional problem with the use of the T-brackets of the prior art is the fact that with sphincter clamps, the camper jacks cannot be removed easily when needed.

Further, the mounting of camper jacks with T-brackets and sphincter clamps is unattractive and unpleasing to the eye.

OBJECTS AND SUMMARY OF THE INVENTION

It is an object of the present invention to provide an mounting system for mounting a camper jack onto a camper body which is less obtrusive.

It is a further object of the present invention to provide an mounting system for mounting a camper jack onto a camper body which allows for easier mounting and removal of the jacks.

It is an additional object of the present invention to provide a mounting system for mounting a camper jack onto a camper body in a secure manner wherein the jack may be supported by three walls.

Yet another object of the present invention is to provide a mounting system for mounting a camper jack into a camper body wherein the jack may be further supported on the camper body by a reinforcing bracket.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a novel bracket is provided for used in mounting a camper jack onto a camper body. The apparatus comprises a bracket having three integral flat portions, a first portion, a second portion, and a third portion, formed into a generally Z-shaped configuration. The second portion forms the middle of the generally Z-shaped bracket. The first portion and the third portion extend perpendicularly from opposite ends of the second portion.

When the mounting bracket is attached to the camper body, the first and second portions conform to the shape of a corner end of the camper body while the third portion projects outwardly from the camper body. A camper jack can be conveniently positioned between the third portion and the second portion of the mounting bracket. A bolt can be used to secure the camper jack to the bracket. A sphincter clamp is not needed.

While positioned in this manner, the camper jack fits closely with the camper body and is less obtrusive. The camper jack corresponds with the corner of the camper body and provides less of an area projecting outwards which can become torn off by passing objects.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DESCRIPTION OF THE PREFERRED EMBODIMENT

Figure 1:
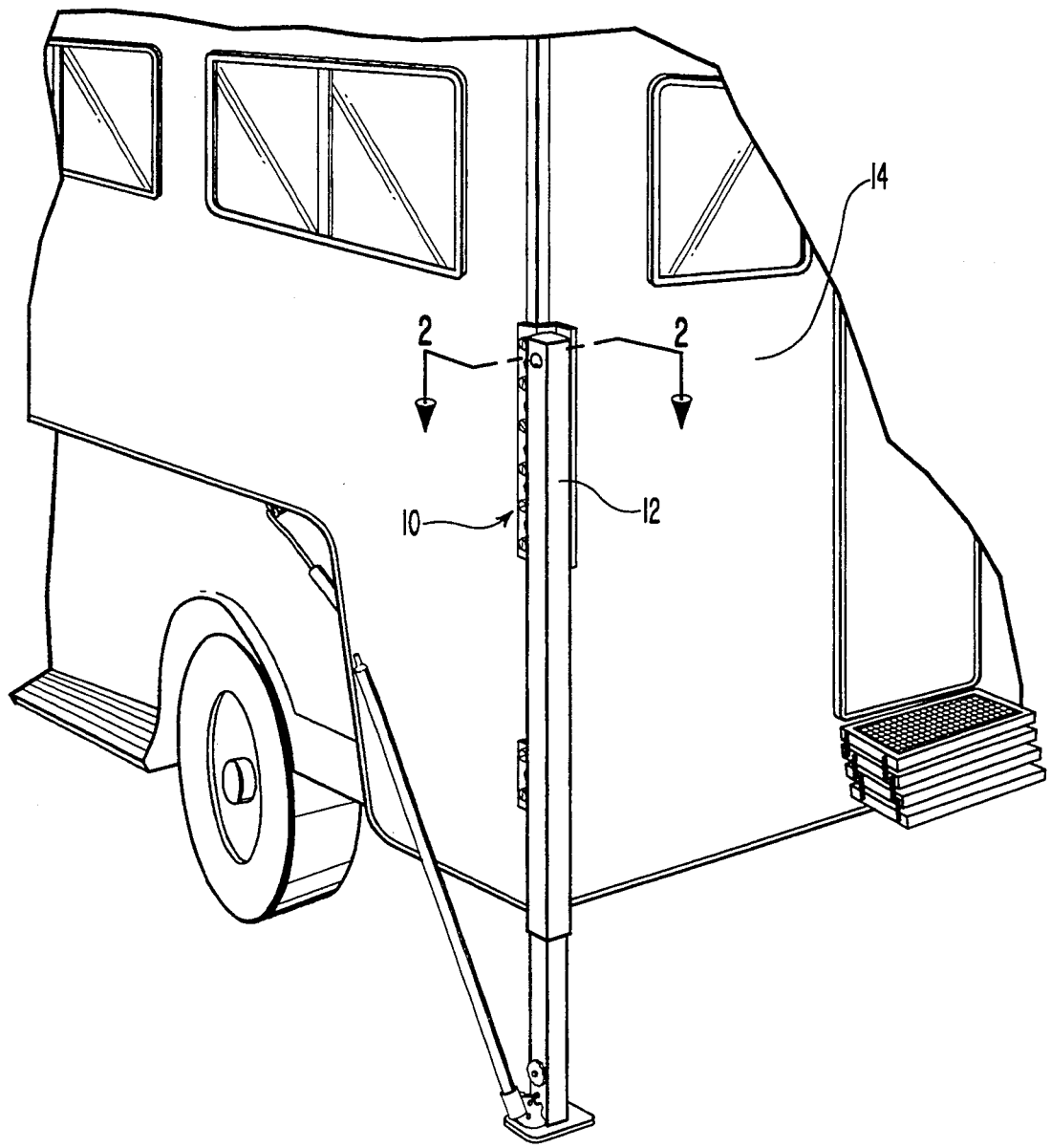
FIG. 1 illustrates a conventional camper body with the jack mounted upon the rear end of the camper.

The present invention as generally illustrated in FIG. 1, comprises an apparatus and mounting assembly for securely mounting a camper jack onto a camper body. The apparatus comprises a generally Z-shaped bracket 10 securely attachable to a camper body 14. Although the shape of the bracket 10 is not precisely a Z-shape, wherein the middle of the Z is slanted, the bracket 10 will nonetheless be referred to as a Z-bracket.

The Z-bracket 10 is comprised of three integral flat portions, a first portion 16, a second portion 18, and a third portion 18. The three integral flat portions are formed into a substantially Z-shaped configuration as will be discussed below.

The second portion 18 forms the middle of the Z-bracket. The first portion 16 and the third portion 20 extend perpendicularly from opposite ends of the second portion 18 and in opposite directions from each other. When the Z-bracket 10 is attached to the camper body 14, the first and second portions, 16 and 18, conform to the shape of a corner edge of the camper body 14, and the third portion 20 projects outwardly from the camper body 14.

The first and second portions, 16 and 18, of the Z-bracket 10 may be securely attached to the camper body 14 by bolts. A camper jack 12 can then be mounted so that the camper jack 12 is positioned between the third portion 20 and the second portion 18 of the Z-bracket 10. In this position, the camper jack 12 fits snugly between the third and second portions, 20 and 18, and projects outwardly from the camper body 14 only as far as the Z-bracket 10 projects.

This positioning is an improvement over the prior art, wherein the jacks are mounted by sphincter clamps away from the bracket. In the prior art, the jacks protrude further than the brackets protrude, thus providing a greater area and an increased chance for objects to contact the jack accidentally and tear off or damage the jacks. Additionally, because the prior art camper jack is mounted further from the camper body, mounting is not as strong as with the present invention.

Further, the mounting assembly of the present invention provides a much more aesthetically pleasing mounting of the camper jack. Most of the bracket 10 is covered and hidden by the camper jack 12. If a rectangular camper jack is used with the bracket, the shape will correspond to the corner of the camper body, and thus will blend even more with the shape of the camper body, and become even less obtrusive.

It can be appreciated that the Z-bracket 10 of the present invention can be used with both rectangular and round camper jacks. It is preferred, however, that rectangular, particularly square, camper jacks be used. As stated earlier, with the square shape, the jack will blend into the shape of the camper body. Additionally, the square shape will fit closely between the second and third portions of the Z-bracket as the flat walls of the square shape will conform to the flat walls of the Z-bracket.

Further, the square shaped jack can be more easily attached to the portions of the Z-bracket. Again, it is easier to mount the flat walls of a square shaped jack to the flat walls of the Z-bracket than to mount the rounded walls of a round shaped jack. However, a round shaped jack may still be used within the scope of the present invention.

It can also be appreciated that the jacks mounted may be either mechanically or hydraulically operable jacks.

Figure 2:
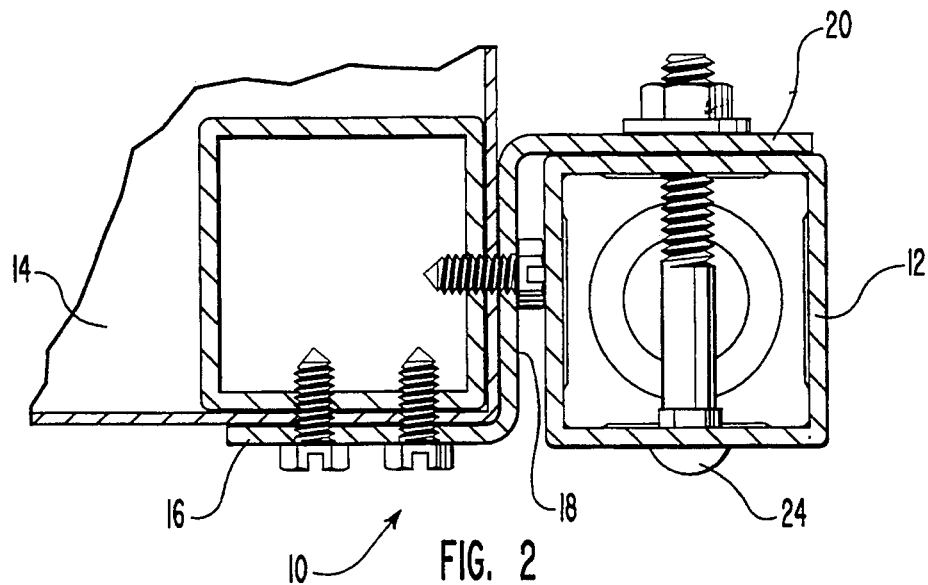
FIG. 2 illustrates a cross-section along lines 2—2 of FIG. 1 to show the configuration of the novel Z-bracket with a camper jack mounted thereon.

Secure attachment of the camper jack 12 to the Z-bracket 10 can be accomplished by bolts. As shown in FIG. 2, in the preferred embodiment, a carriage bolt 24 extends through the camper jack 12 to connect the camper jack 12 to the Z-bracket 10. However, other methods of bolting known in the art can also be used within the scope of the present invention.

Figure 3:
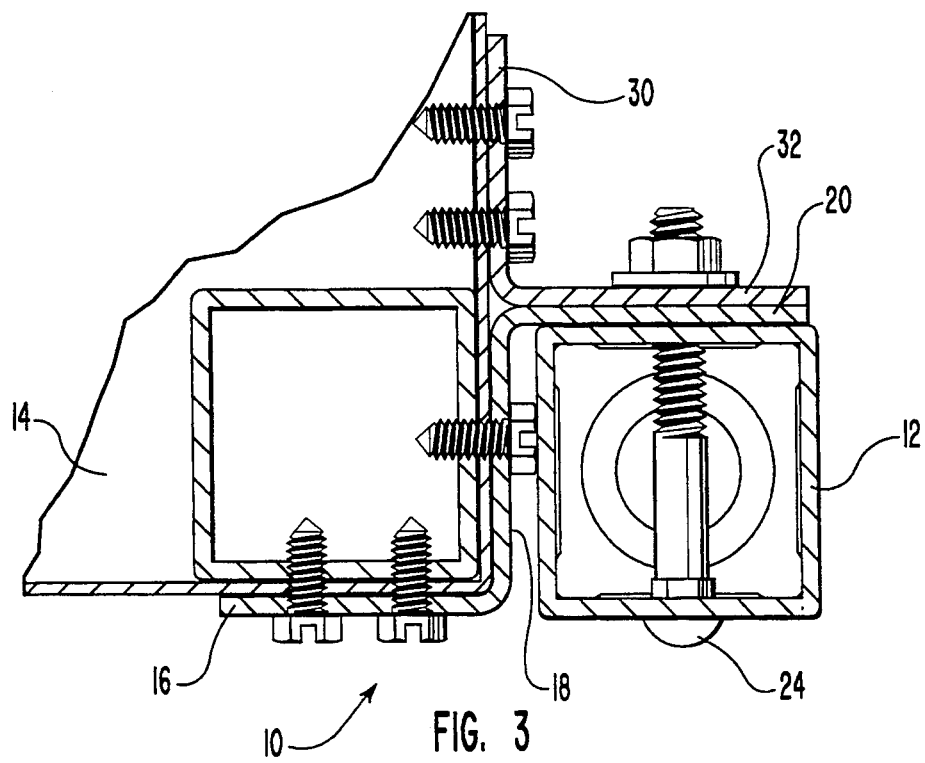
FIG. 3 illustrates a cross-section as shown in FIG. 2, with an added reinforcing support mounted thereon.

Another important feature within the scope of the present invention comprises a reinforcing bracket 28 which may be used to strengthen the mounting of the camper jack 12 to the camper body 14. As illustrated in FIG. 3, the reinforcing bracket 28 comprises a first reinforcing portion 30 and a second reinforcing portion 32.

The first and second reinforcing portions, 30 and 32, are formed into an L-shape. The first reinforcing portion 30 can be bolted to a wall of the camper body 14, while the second reinforcing portion 32 can be bolted to the third portion 20 of the Z-bracket 10. As seen in FIG. 3, the carriage bolt 24 can be passed through the camper jack 12 and through both the third portion 20 of the Z-bracket 10 and the second reinforcing portion 32 of the reinforcing bracket 28. When this occurs, the camper jack 12 is securely supported on the camper body 14 by basically four walls, the first and second portions, 16 and 18, of the Z-bracket 10, the first reinforcing portion 30 of the reinforcing bracket 28, and the double wall formed by the third portion 20 of the Z-bracket 10 and the second reinforcing portion 32 of the reinforcing bracket 28.

This ability to position a reinforcing bracket 28 beside the novel Z-bracket 10 of the present invention is a large advantage over the prior art. With the T-brackets used in the prior art, a reinforcing L-shaped bracket cannot be positioned against the portion of the T-bracket upon which the camper jack is mounted. Therefore, mounting of the camper jack in the prior art is not as secure as with the present invention.

In summary, the mounting assembly of the present invention provides a novel way of mounting a camper jack onto a camper body which is attractive, unobtrusive, and secure. It can be appreciated that the camper jack and bracket may be painted a similar color to the camper body such that the camper jack and bracket will blend into the camper body for a clean and attractive appearance.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for mounting a camper jack onto a camper body comprising a mounting bracket securely attachable to the camper body, said mounting bracket consisting of a first flat portion, a second flat portion, and a third flat portion, said three flat portions being formed integrally into a generally Z-shaped configuration capable of supporting the weight of the camper body, wherein the second portion forms the middle of the mounting bracket and the first and third portions extend perpendicularly from opposite ends of the second portion and in opposite directions, such that when said mounting bracket is attached to the camper body, the first and second portions are secured to a corner edge of the camper body, and the third portion projects outwardly from the camper body, said third portion providing an attachment site for a camper jack.

2. A mounting assembly as defined in claim 1, wherein the camper jack comprises a rectangular camper jack.

3. An apparatus as defined in claim 1 wherein the camper jack fits substantially flush against the second portion and the third portion of the mounting bracket.

4. A mounting assembly as defined in claim 1, wherein the camper jack comprises a round camper jack.

5. A mounting assembly as defined in claim 1, wherein the bracket is securely attachable to the camper body by bolts.

6. A mounting assembly as defined in claim 1, further comprising an L-shaped reinforcing bracket having a first portion and a second portion, wherein the first portion is securely attachable to the camper body in a position adjacent and parallel to the third portion of the mounting bracket, said second portion of the reinforcing bracket being securely attached to the third portion of the mounting bracket, thereby providing reinforcing support for the mounting assembly.

* * * * *